United States Patent
Paolini et al.

(10) Patent No.: US 10,577,115 B2
(45) Date of Patent: Mar. 3, 2020

(54) NACELLE ALIGNMENT ASSEMBLY WITH A MULTI-PIECE LOCATOR

(71) Applicant: Rohr, Inc., Chula Vista, CA (US)

(72) Inventors: Thomas Paolini, Santee, CA (US);
Marc Schommer, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 491 days.

(21) Appl. No.: 15/382,121

(22) Filed: Dec. 16, 2016

(65) Prior Publication Data

US 2018/0170566 A1    Jun. 21, 2018

(51) Int. Cl.
| B64D 29/08 | (2006.01) |
| B64D 29/06 | (2006.01) |
| F02K 3/06  | (2006.01) |

(52) U.S. Cl.
CPC ............... *B64D 29/06* (2013.01); *F02K 3/06* (2013.01); *F05D 2220/323* (2013.01); *F05D 2240/14* (2013.01)

(58) Field of Classification Search
CPC .......................... B64D 29/06; F05D 2230/644
See application file for complete search history.

(56) References Cited

U.S. PATENT DOCUMENTS

| 2,771,063 | A | * | 11/1956 | Skistimas | B64D 29/06 123/41.7 |
| 4,365,775 | A | | 12/1982 | Glancy | |
| 5,518,206 | A | * | 5/1996 | Arnold | B64D 29/06 244/129.4 |
| 8,464,541 | B2 | * | 6/2013 | Andre | B64D 29/06 244/53 R |
| 8,567,712 | B2 | * | 10/2013 | Porte | B64D 29/08 244/129.4 |
| 9,243,697 | B2 | | 1/2016 | Schroeder et al. | |
| 2016/0160798 | A1 | | 6/2016 | Guerin et al. | |

* cited by examiner

*Primary Examiner* — Brian M O'Hara
(74) *Attorney, Agent, or Firm* — Getz Balich LLC

(57) ABSTRACT

A system is provided for an aircraft propulsion system. This system includes a nacelle structure, a nacelle cowl and an alignment assembly. The nacelle cowl is configured to move between a closed position and an open position. The alignment assembly includes a pair of mating components respectively arranged with the nacelle structure and the nacelle cowl. A first of the pair of mating components is configured as or otherwise includes a receptacle. A second of the pair of mating components is configured as or otherwise includes a locator. The locator is configured to mate with the receptacle and thereby locate the nacelle cowl relative to the nacelle structure when the nacelle cowl is in the closed position. The locator includes a base and a guide attached to the base. The guide is formed as a discrete body from the base.

16 Claims, 12 Drawing Sheets

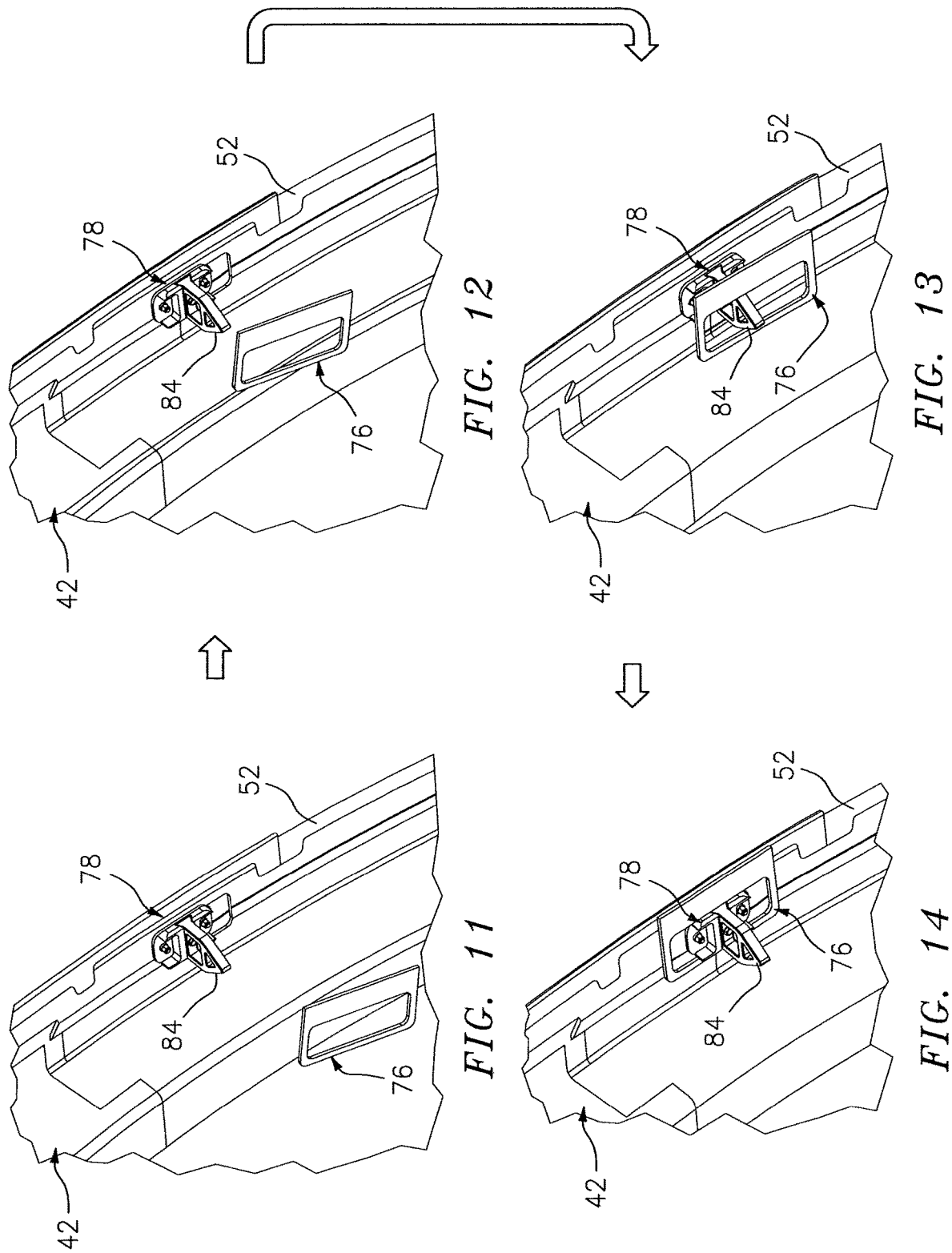

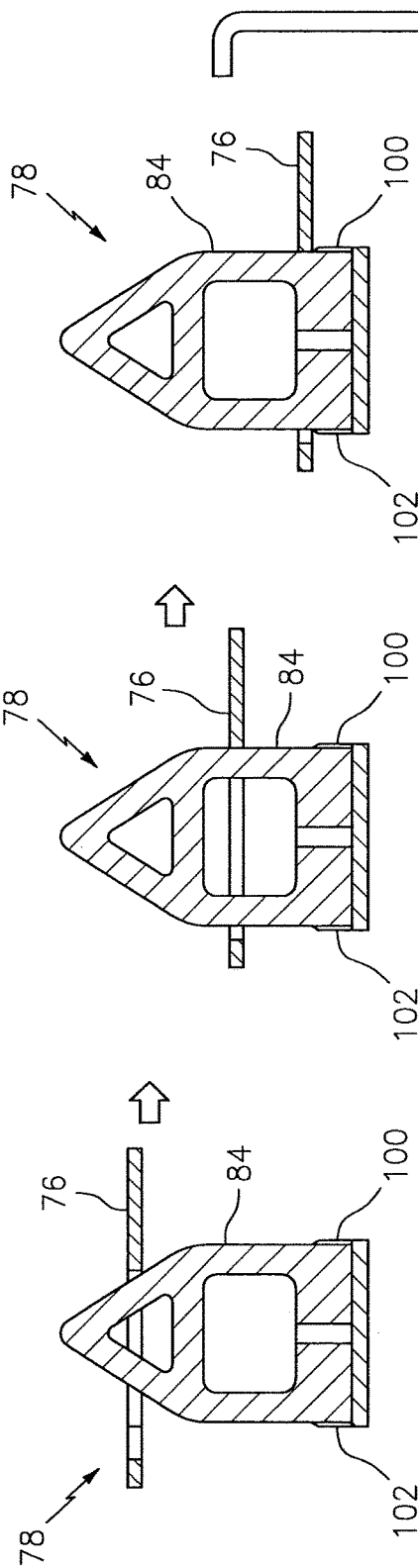
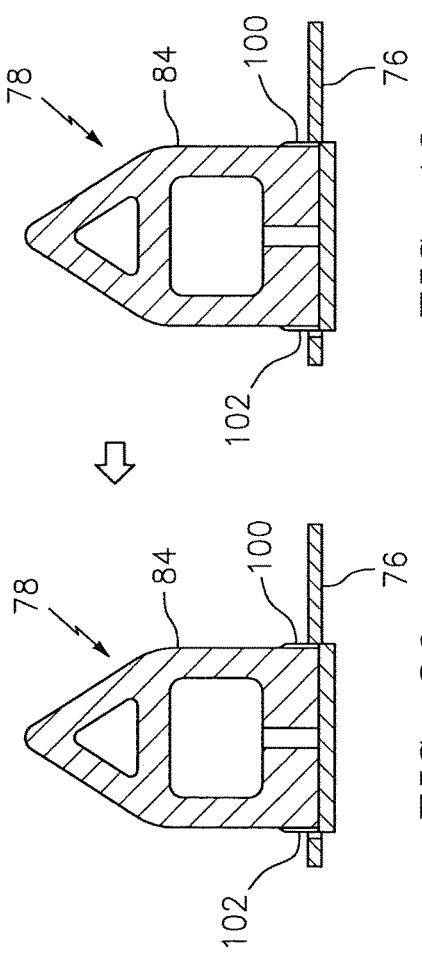
FIG. 15  FIG. 16  FIG. 17
FIG. 20  FIG. 19  FIG. 18

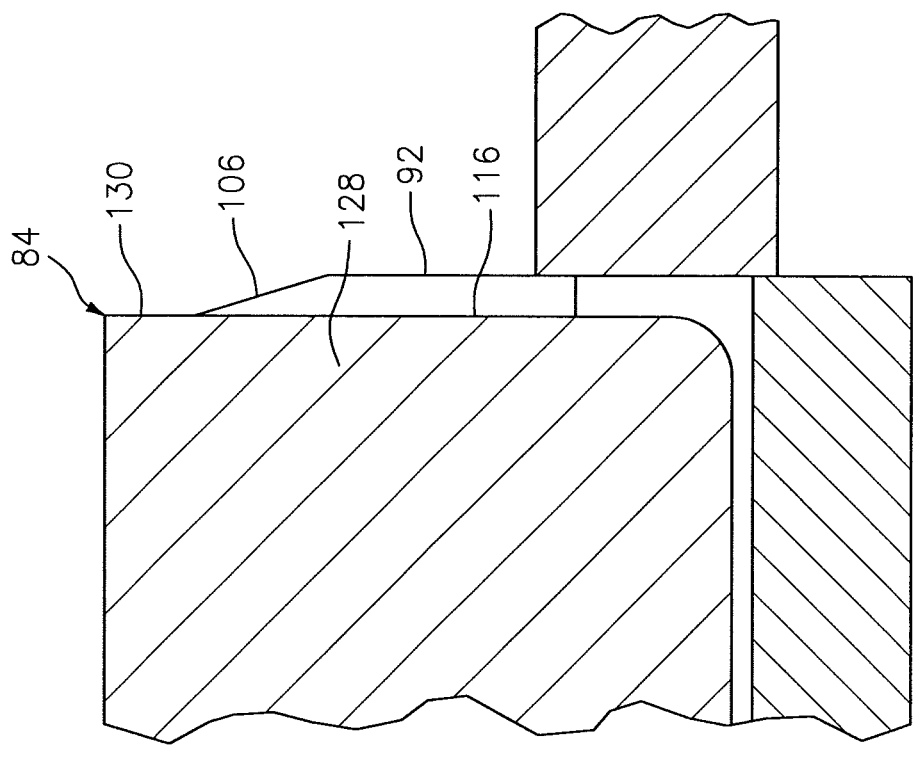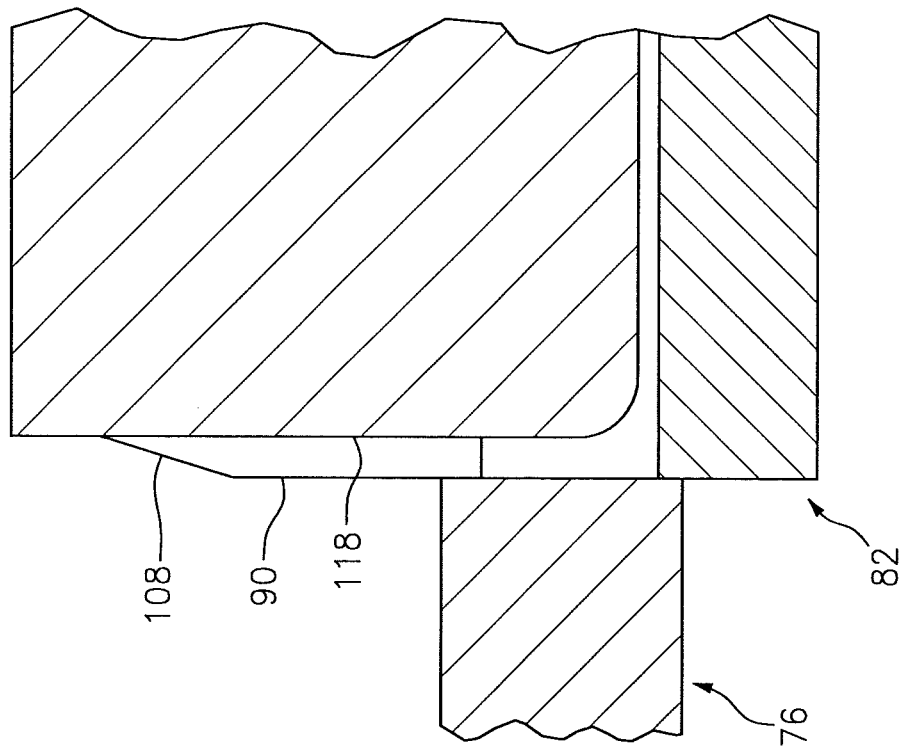
FIG. 21

NACELLE ALIGNMENT ASSEMBLY WITH A MULTI-PIECE LOCATOR

BACKGROUND OF THE INVENTION

1. Technical Field

This disclosure relates generally to an aircraft propulsion system and, more particularly, to an alignment assembly for a nacelle of an aircraft propulsion system.

2. Background Information

A typical nacelle for an aircraft propulsion system includes an array of alignment assemblies for aligning fan cowls with an inlet structure of the nacelle when those cowls are closed. Various types and configurations of alignment assemblies are known in the art. While there prior art alignment assemblies have various benefits, there is still room in the art for improvement. Notably, when the prior art alignment assemblies break, they are difficult to replace and repair.

SUMMARY OF THE DISCLOSURE

According to an aspect of the present disclosure, a system is provided for an aircraft propulsion system. This system includes a nacelle structure, a nacelle cowl and an alignment assembly. The nacelle cowl is configured to move between a closed position and an open position. The alignment assembly includes a pair of mating components respectively arranged with the nacelle structure and the nacelle cowl. A first of the pair of mating components is configured as or otherwise includes a receptacle. A second of the pair of mating components is configured as or otherwise includes a locator. The locator is configured to mate with the receptacle and thereby locate the nacelle cowl relative to the nacelle structure when the nacelle cowl is in the closed position. The locator includes a base and a guide attached to the base. The guide is formed as a discrete body from the base.

According to another aspect of the present disclosure, another system is provided for an aircraft propulsion system. This system includes a nacelle structure, a nacelle cowl and an alignment assembly. The nacelle cowl is configured to move between a closed position and an open position. The alignment assembly includes a receptacle and a locator. The receptacle is configured with one of the nacelle structure and nacelle cowl. The locator is mounted to the other one of the nacelle structure and the nacelle cowl. The locator is configured to mate with the receptacle and thereby locate the nacelle cowl relative to the nacelle structure when the nacelle cowl is in the closed position. The locator includes a base and a guide connected to the base. The mount is configured from or otherwise includes first material. The guide is configured from or otherwise includes second material that is different than the first material.

According to still another aspect of the present disclosure, still another system is provided for an aircraft propulsion system. This system includes a receptacle and a locator. The receptacle is configured as or otherwise includes an annular plate. The locator includes a base and a guide projecting out and cantilevered from the base. The guide is configured to project into and slide against the annular plate as the receptacle moves towards a fully mated position to thereby guide the annular plate onto the base. The base is configured to mate with the annular plate when the receptacle is in the fully mated position. The base is configured from or otherwise includes metal. The guide is configured from or otherwise includes non-metal material.

The first material may be or otherwise include metal. The second material may be or otherwise include non-metal material.

The guide may be formed as a discrete body from the base.

The receptacle may be configured to impart a load onto the base when the receptacle is in the fully mated position. The receptacle may be further configured not to impart a load onto the guide when the receptacle is in the fully mated position.

A nacelle structure and a nacelle cowl may be included. The nacelle cowl may be configured to move between a closed position and an open position. The receptacle may be in the fully mated position when the nacelle cowl is in the closed position. The receptacle may be mounted to the nacelle structure. The base may be mounted to the nacelle cowl.

The base may be mounted to and connect the guide to a respective one of the nacelle structure and the nacelle cowl. The guide may project out and may be cantilevered from the base.

The guide may be configured to project into and slide against the receptacle as the nacelle cowl moves towards the closed position to thereby guide the receptacle onto the base. The base may be configured to mate with the receptacle when the nacelle cowl is in the closed position.

The receptacle may be configured to impart a load onto the base when the nacelle cowl is in the closed position.

The receptacle may be configured not to impart a load onto the guide when the nacelle cowl is in the closed position.

The guide may be removably attached to the base.

The guide may be attached to the base at an interlocking joint.

The guide may be attached to the base by a fastener.

The base may be configured from or otherwise include first material. The guide may be configured from or otherwise include second material that is different from the first material.

The base may be configured from or otherwise include metal. The guide may be configured from or otherwise include polymer.

The polymer may be or otherwise include thermoset material.

The polymer may be or otherwise include thermoplastic material.

The first of the pair of mating components may be mounted to the nacelle structure. The second of the pair of mating components may be mounted to the nacelle cowl.

The nacelle structure may be configured as or otherwise include a nacelle inlet structure. The nacelle cowl may be configured as or otherwise include a fan cowl.

The foregoing features and the operation of the invention will become more apparent in light of the following description and the accompanying drawings.

BRIEF DESCRIPTION OF THE DRAWINGS

FIGS. 11-14 are perspective illustrations depicting the alignment assembly of FIG. 4 during a sequence of steps as the multi-piece locator is being mated with the receptacle.

FIGS. 15-20 are side illustrations depicting the alignment assembly of FIG. 4 during a sequence of steps as the multi-piece locator is being mated with the receptacle.

FIG. 21 is a side illustration of the multi-piece locator mated with the receptacle.

DETAILED DESCRIPTION

Figure 1:
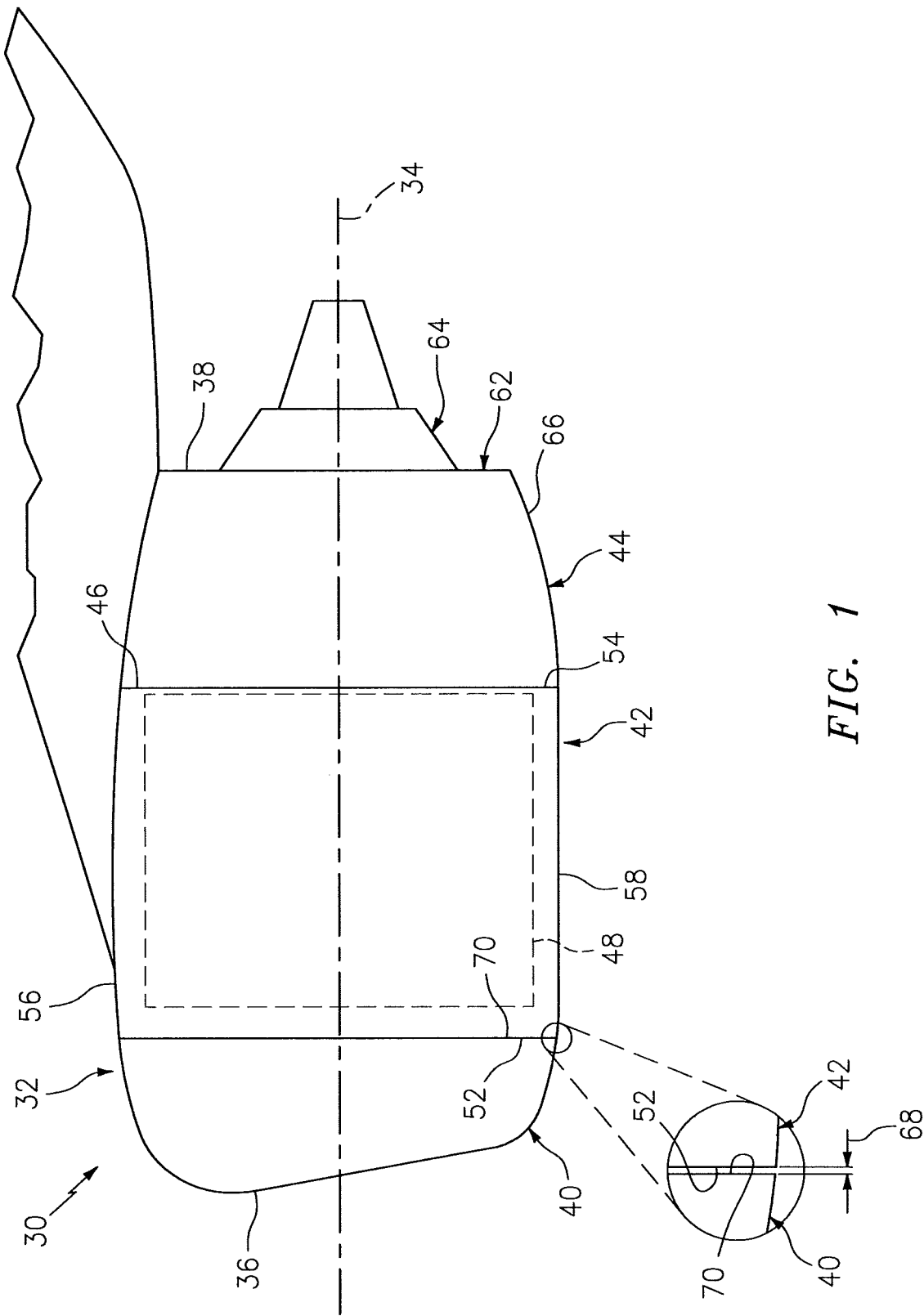
FIG. 1 is a side schematic illustration of an aircraft propulsion system.

FIG. 1 illustrates an aircraft propulsion system 30 for an aircraft such as a commercial airliner. The propulsion system 30 includes a nacelle 32 and a gas turbine engine. This gas turbine engine may be configured as a high-bypass turbofan engine. Alternatively, the gas turbine engine may be configured as any other type of gas turbine engine capable of propelling the aircraft during flight.

The nacelle 32 is configured to house and provide an aerodynamic cover for the gas turbine engine. The nacelle 32 extends along an axial centerline 34 between a nacelle forward end 36 and a nacelle aft end 38. The nacelle 32 may include a nacelle inlet structure 40, a set of fan cowls 42 (one such cowl visible in FIG. 1; see also FIGS. 2 and 3) and an aft structure 44, which may be configured as part of or include a thrust reverser system.

The inlet structure 40 is disposed at the nacelle forward end 36. The inlet structure 40 is configured to direct a stream of air through an inlet opening at the nacelle forward end 36 and into a fan section of the gas turbine engine.

The fan cowls 42 are disposed axially between the inlet structure 40 and the aft structure 44. Each fan cowl 42 of FIG. 1, in particular, is disposed at an aft end 46 of a stationary portion of the nacelle 32, and extends forward to the inlet structure 40. Each fan cowl 42 is generally axially aligned with a fan section of the gas turbine engine. The fan cowls 42 are configured to provide an aerodynamic covering for a fan case 48, which circumscribes the fan section and partially forms an outer peripheral boundary of a bypass flowpath of the propulsion system 30.

The term "stationary portion" is used above to describe a portion of the nacelle 32 that is stationary during propulsion system 30 operation (e.g., during takeoff, aircraft flight and landing). However, the stationary portion may be otherwise movable for propulsion system 30 inspection/maintenance; e.g., when the propulsion system 30 is non-operational. Each of the fan cowls 42 of FIGS. 2 and 3, in particular, is configured to provide access to components of the gas turbine engine such as the fan case 48 and/or peripheral equipment configured therewith for inspection, maintenance and/or otherwise. Each of fan cowls 42 is movably (e.g., pivotally) mounted with the aircraft propulsion system 30 by, for example, a pivoting hinge system. In this manner, each of the fan cowls 42 may be pivoted about a pivot axis 50 between a closed position (see FIG. 2) and an open position (see FIG. 3), which pivot axis 50 may be substantially parallel with the axial centerline 34.

Each of the fan cowls 42 may have a parti-tubular/arcuate body. More particularly, referring to FIG. 1, each of the fan cowls 42 extends axially along the centerline 34 between a forward cowl edge 52 and an aft cowl edge 54. Referring again to FIGS. 2 and 3, each of the fan cowls 42 extends generally circumferentially about the centerline 34 between a pivot edge 56 (e.g., top hinge edge/side) and a latch edge 58 (e.g., bottom latch edge/side). Each fan cowl 42 is pivotally mounted to the aircraft propulsion system 30 at (e.g., on, adjacent or proximate) its pivot edge 56. Each fan cowl 42 may be latched to the other fan cowl 42 at its latch edge 58 via a system of one or more latches. It is worth noting, each of the fan cowls 42 has a radius 60 (see FIG. 2) measured from the axial centerline 34 to the external surface of the fan cowl 42. This radius 60 may vary at different locations of the fan cowl 42 such that the fan cowl 42 has a complex three dimensional curvature. Of course, the present disclosure is not limited to such a variable radius configuration.

Referring to FIG. 1, the aft structure 44 is disposed at the nacelle aft end 38. The aft structure 44 is configured to faun a nozzle 62 of the bypass flowpath with an inner assembly 64/portion of the nacelle 32; e.g., an inner fixed structure (IFS). The aft structure 44 may include one or more translating sleeves 66 (one such sleeve visible in FIG. 1) for the thrust reverser system. The present disclosure, however, is not limited to such a translatable sleeve thrust reverser system, or to an aircraft propulsion system with a thrust reverser system.

The nacelle 32 further includes one or more alignment assemblies associated with each of the fan cowls 42. These alignment assemblies are configured to axially position the fan cowls 42 relative to the inlet structure 40. More particularly, as described below in further detail, the alignment assemblies are configured to move each fan cowl 42 into proper axial position and thereby axially align the fan cowl 42 with the inlet structure 40 as that fan cowl 42 is being closed. The alignment assemblies are also configured to maintain a proper axial alignment and, thus, a predetermined axial gap 68 between the aft edge 70 of the inlet structure 40 and the forward cowl edge 52.

Figure 2:
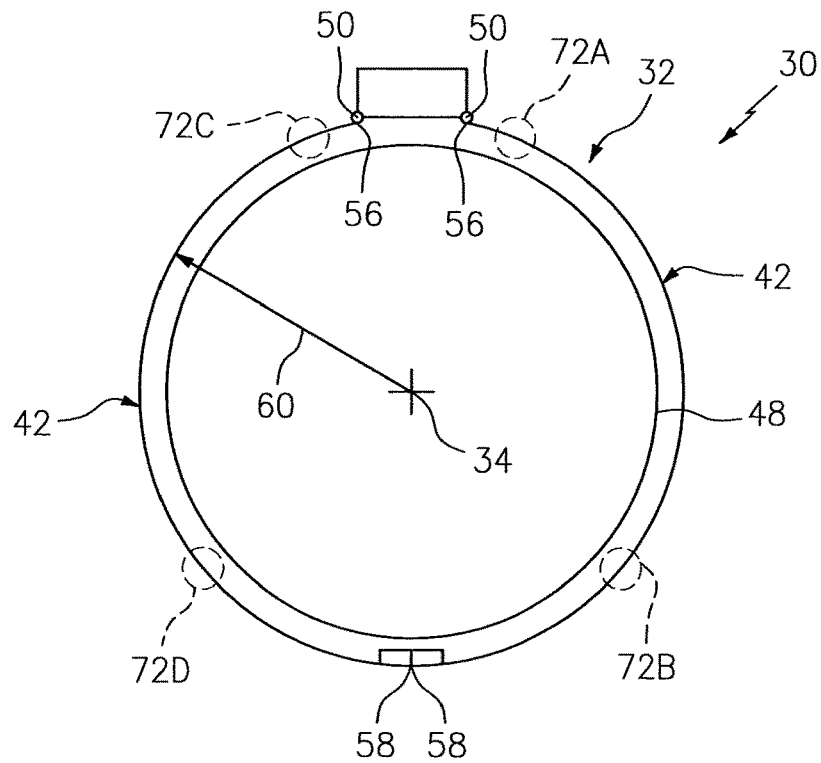
FIG. 2 is a cross-sectional schematic illustration of the propulsion system with fan cowls in closed positions.
Figure 3:
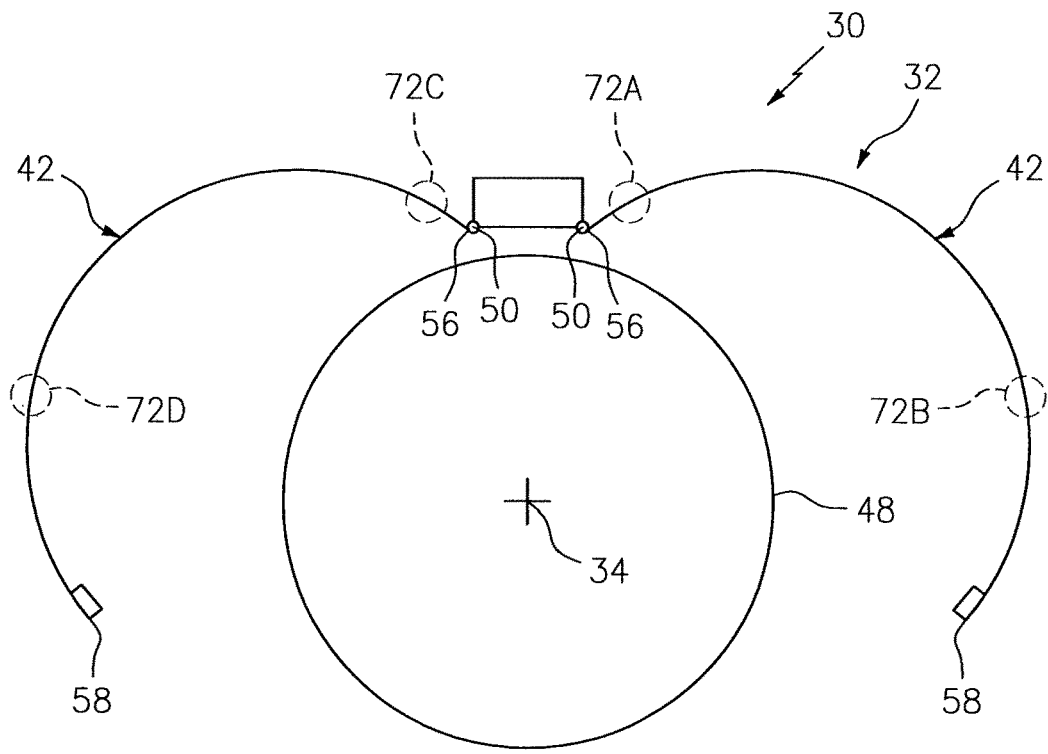
FIG. 3 is a cross-sectional schematic illustration of the propulsion system with the fan cowls in open positions.

Referring to FIGS. 2 and 3, the alignment assemblies are respectively arranged at discrete locations 72A-D (generally referred to as "72") about the axial centerline 34 in an array. Exemplary alignment assembly locations 72 are encircled by the dashed regions shown in FIGS. 2 and 3. Of course, the alignment assemblies of present disclosure are not limited to such exemplary circumferential locations 72.

Figure 4:
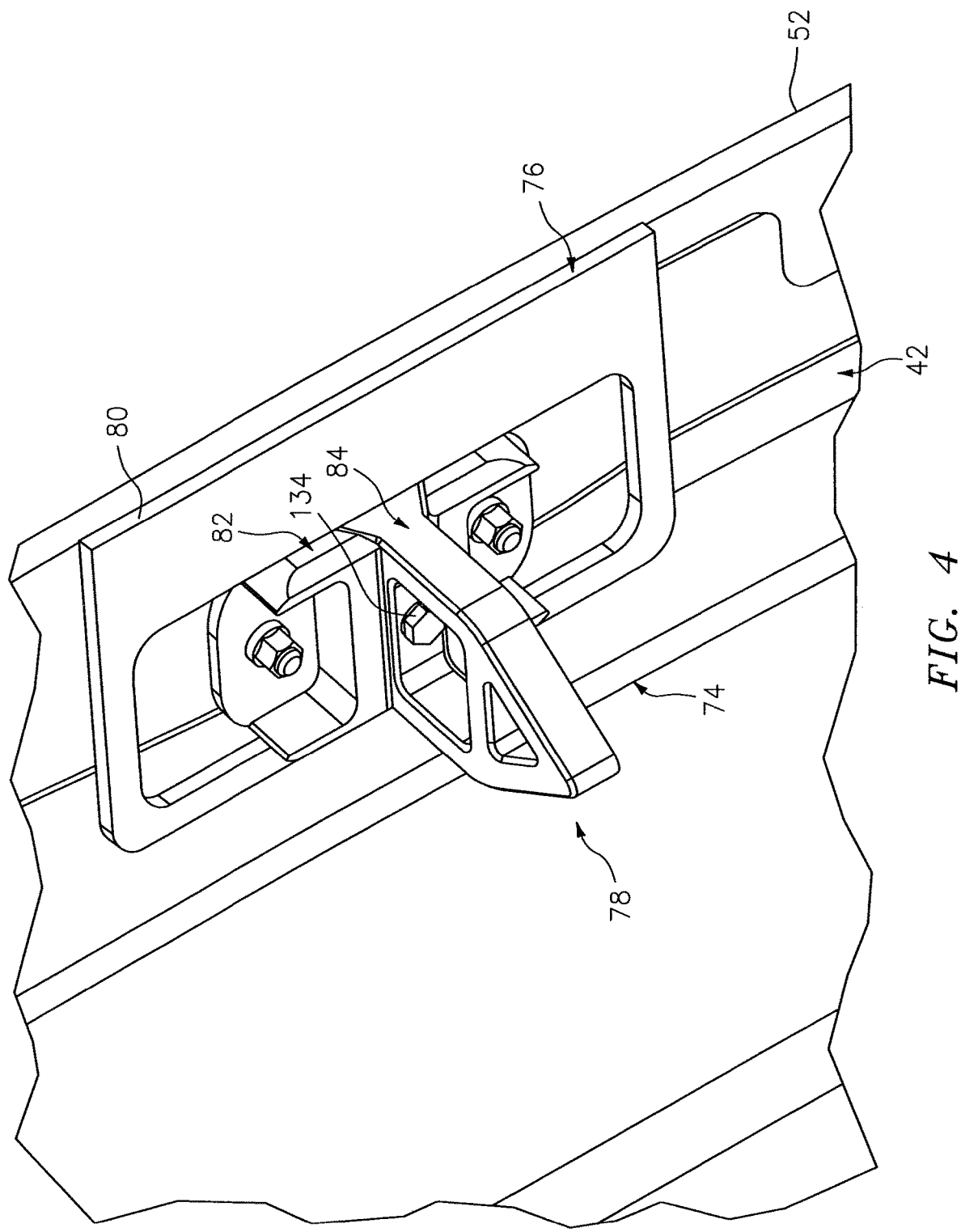
FIG. 4 is a perspective illustration of an alignment assembly that includes a receptacle and a multi-piece locator mounted to one of the fan cowls.
Figure 23:
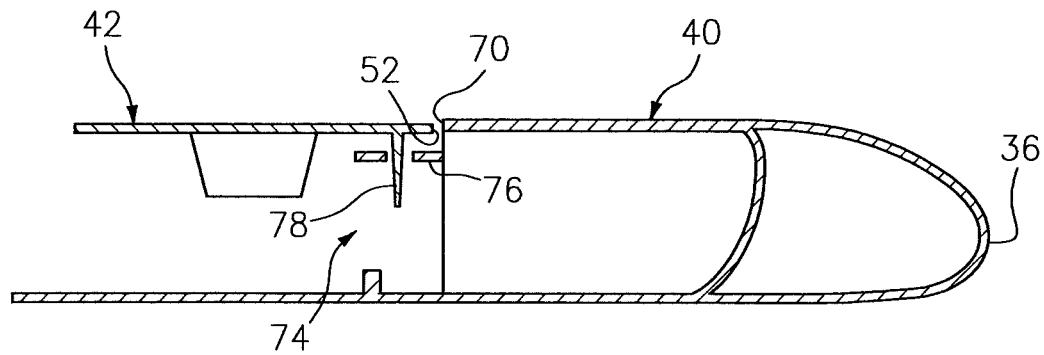
FIG. 23 is a side-sectional schematic illustration of an interface between an inlet structure and one of the fan cowls.
Figure 24:
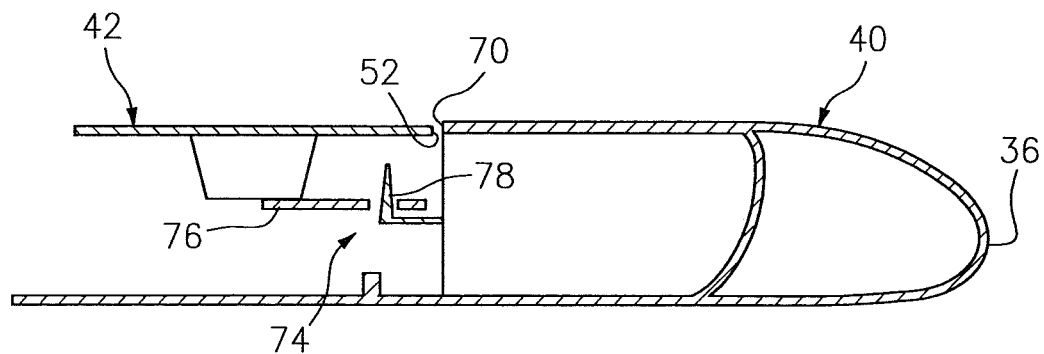
FIG. 24 is a side-sectional schematic illustration of another interface between the inlet structure and one of the fan cowls.
Figure 25:
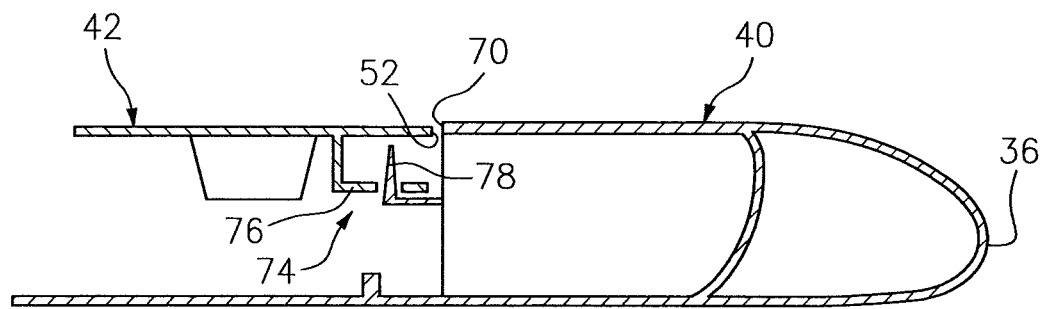
FIG. 25 is a side-sectional schematic illustration of still another interface between the inlet structure and one of the fan cowls.

FIG. 4 is a perspective illustration of an exemplary one of the alignment assemblies. This alignment assembly 74 includes a pair of mating components. The first mating component is configured as or otherwise includes a receptacle 76, which is mounted to the inlet structure 40 at its aft end 70 (see FIG. 23). Note, the inlet structure 40 is not shown in FIG. 4 for ease of illustration. The second mating component is configured as or otherwise includes a locator 78, which is mounted to the fan cowl 42 at its forward cowl end 52. Of course, in other embodiments, the arrangement of the mating components may be reversed such that the receptacle 76 is mounted to the fan cowl 42 and the locator 78 is mounted to the inlet structure 40; e.g., see FIGS. 24 and 25.

The receptacle 76 of FIG. 4 includes an annular plate 80. Herein, the term "annular" may describe a body (e.g., a rim) that forms a central aperture, where that body may have any suitable cross-sectional geometry; e.g., rectangular as shown in FIG. 4, circular or otherwise. The annular plate 80 may be configured as a stand-alone body, or configured as part of or otherwise connected to another structure of the receptacle 76; e.g., a mounting and/or support structure. The receptacle 76 may be mounted to the inlet structure 40 using various techniques; e.g., mechanical attachment via one or more fasteners and/or a bonded attachment via welding, brazing, adhering or otherwise. Of course, in other embodiments, the receptacle 76 may be fainted as an integral part of the nacelle structure to which it is attached; in the FIG. 4 embodiment, the inlet structure 40.

Figure 5:
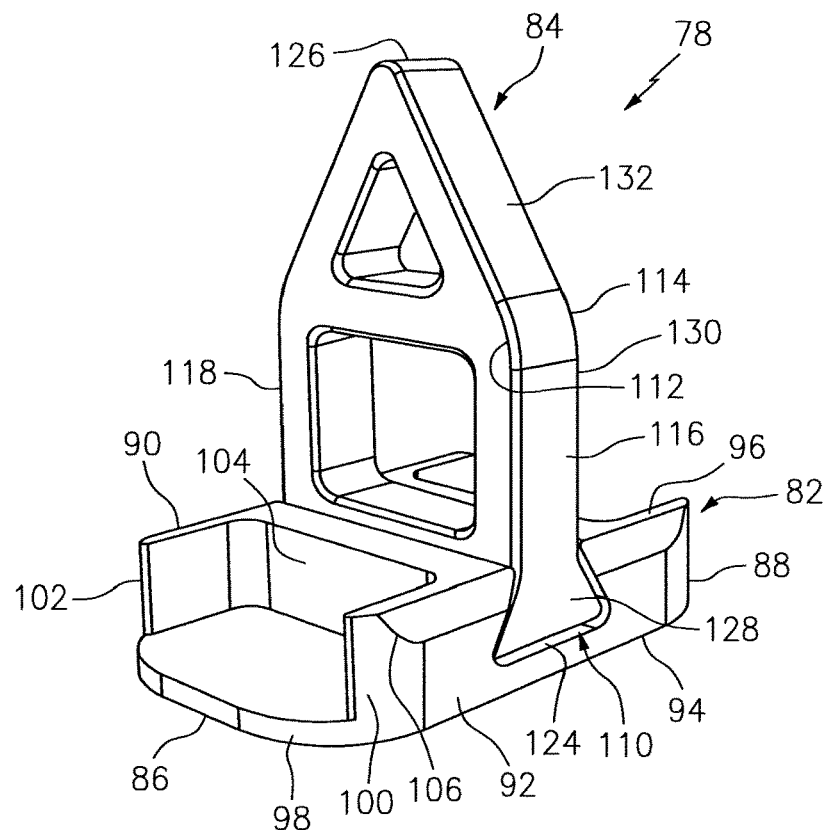
FIG. 5 is a perspective illustration of the multi-piece locator.
Figure 6:
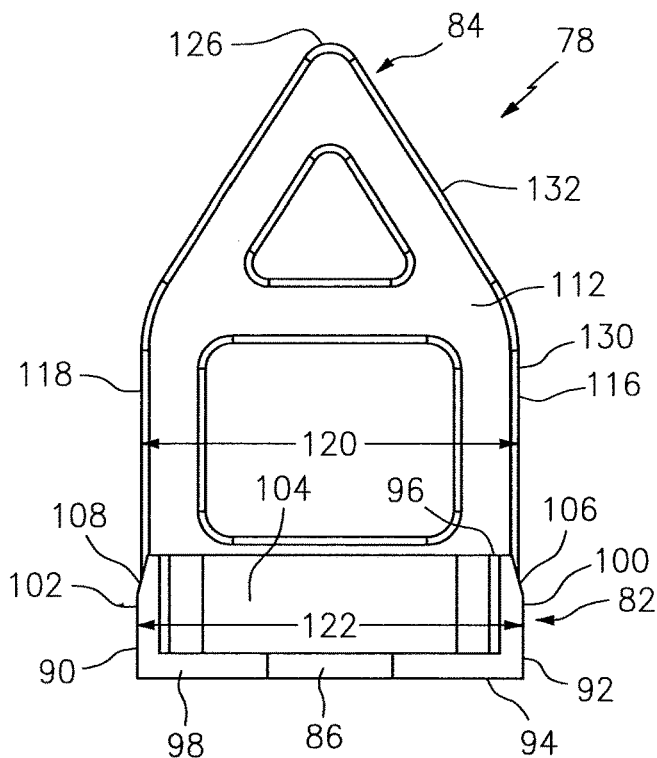
FIG. 6 is an illustration of a lateral side of the multi-piece locator.
Figure 7:
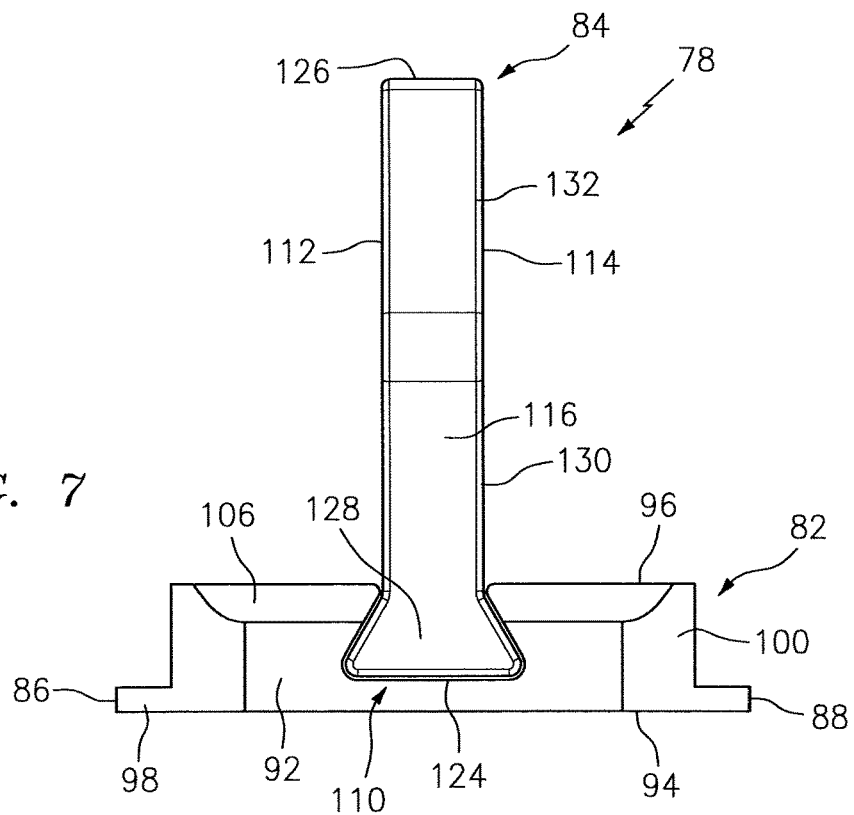
FIG. 7 is an illustration of a longitudinal side of the multi-piece locator.

Referring to FIGS. 5-7, the locator 78 is configured as a multi-piece locator; e.g., a two piece locator. More particularly, the locator 78 of FIGS. 5-7 includes a locator base 82 and a locator guide 84, where the base 82 and the guide 84 are discretely faulted bodies which are attached (e.g., removably attached) to one another as described below in further detail.

The base 82 extends laterally between opposing lateral base sides 86 and 88. The base 82 extends longitudinally between opposing longitudinal base sides 90 and 92. The base 82 extends vertically between opposing vertical base ends 94 and 96, where the vertical base end 94 is configured to engage the nacelle structure to which the locator 78 is attached; in the FIG. 4 embodiment, the fan cowl 42.

The base 82 of FIGS. 5-7 is configured with a trussed (e.g., I-beam, H-beam) structure on a base plate 98, which is located at and defines the vertical base end 94. The base 82, for example, may include the base plate 98, a pair of flanges 100 and 102 and a web 104. The base plate 98 is configured as a mounting plate, which may be mounted to the fan cowl 42 using various techniques; e.g., mechanical attachment via one or more fasteners and/or a bonded attachment via welding, brazing, adhering or otherwise. The flanges 100 and 102 and the web 104 project vertically outward from the base plate 98 to the opposing vertical base end 96. The flange 100 is located at and may at least partially define the longitudinal base side 92. This flange 100 also extends laterally along the respective longitudinal base side 92 towards (or to) the lateral base sides 86 and 88. The flange 100 may include a tapered (e.g., ramped) portion 106 at its distal vertical end and at the longitudinal base side 92. The flange 102 is located at and may at least partially define the opposing longitudinal base side 90. This flange 102 also extends laterally along the respective longitudinal base side 90 towards (or to) the lateral base sides 86 and 88. The flange 102 includes a tapered (e.g., ramped) portion 108 at its distal vertical end and at the longitudinal base side 90. The web 104 is connected to and extends longitudinally between the flanges 100 and 102.

The base 82 of FIGS. 5-7 is further configured with a channel 110 such as, for example, a dovetail mortise/groove. This channel 110 extends vertically partially into the base 82 from the vertical base end 96. The channel 110 extends laterally within the base 82; e.g., within the web 104 and central portions of the flanges 100 and 102. The channel 110 extends longitudinally through (or into) the base 82; e.g., through the web 104 and central portions of the flanges 100 and 102 to the longitudinal base sides 90 and 92.

The base 82 is configured from a base material. An example of a suitable base material is metal; e.g., steel, aluminum, aluminum alloy, titanium, titanium alloy, etc. The present disclosure, however, is not limited to the foregoing exemplary base materials or material type.

Figure 8:
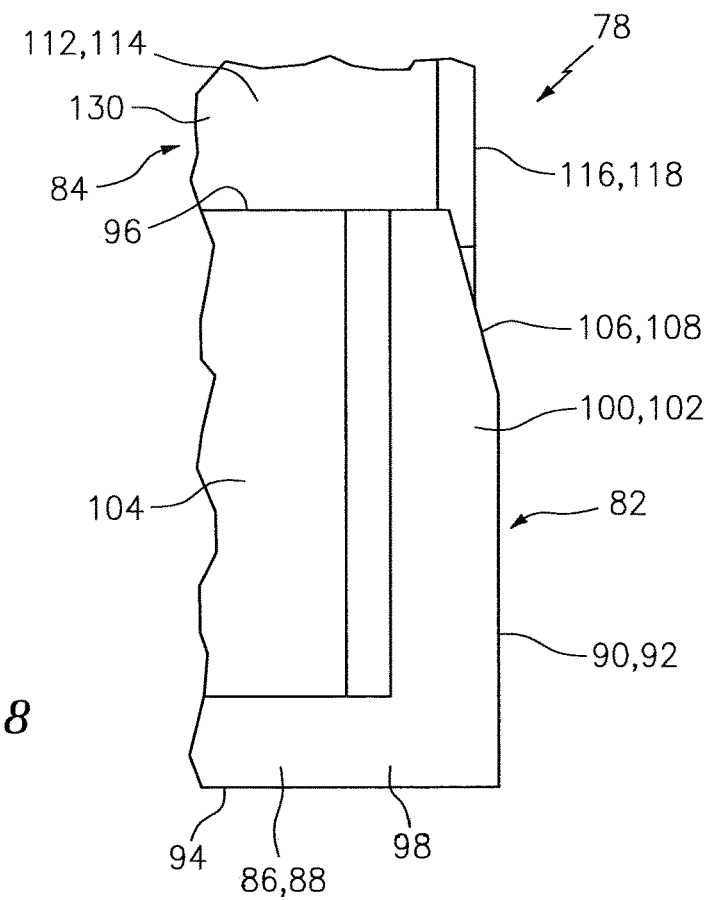
FIG. 8 is an illustration of a portion of the lateral side of the locator at an interlocking joint between a guide and a base of the multi-piece locator.
Figure 9:
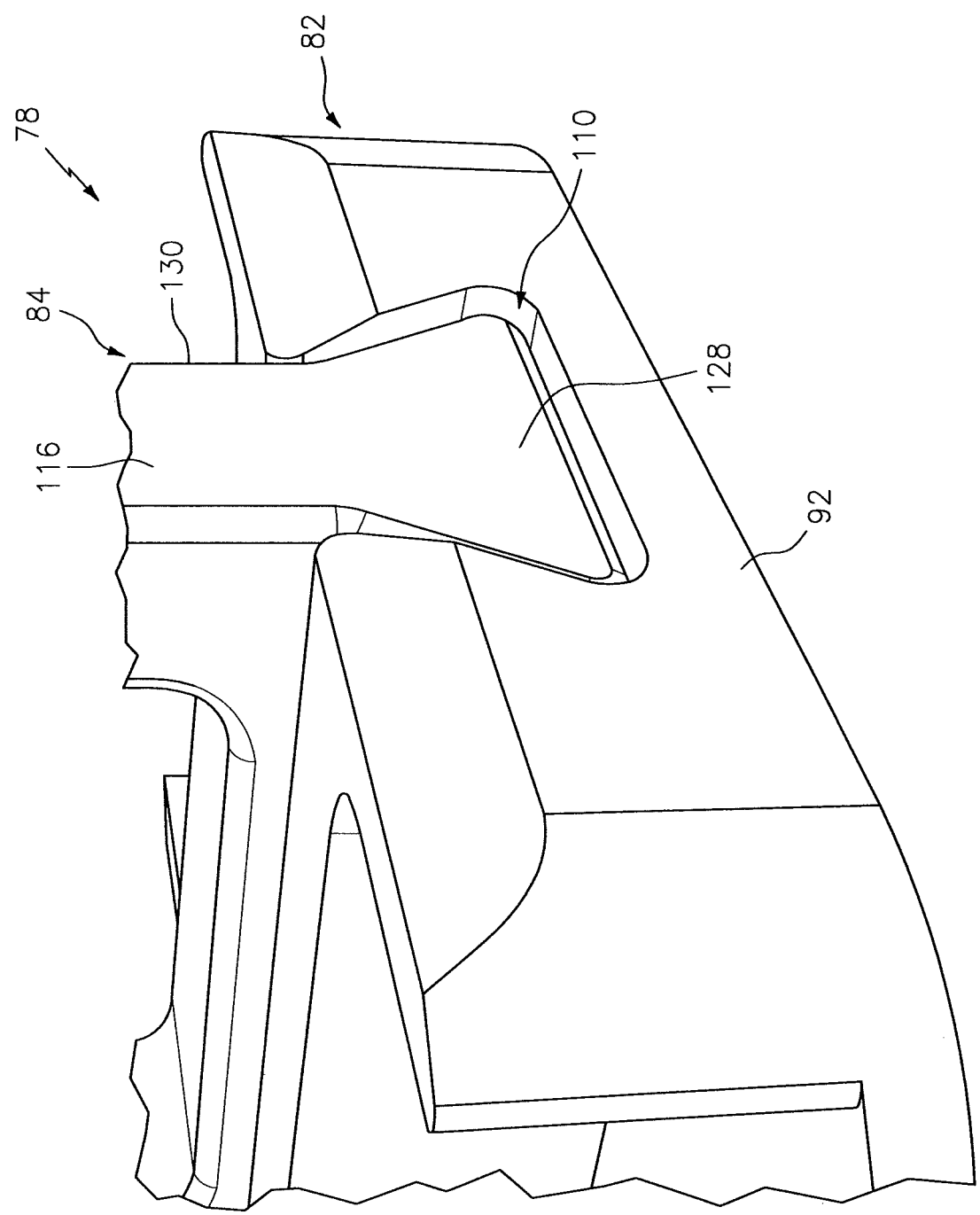
FIG. 9 is a perspective illustration of a portion of the multi-piece locator at the interlocking joint between the guide and the base.

The guide 84 extends laterally between opposing lateral guide sides 112 and 114. The guide 84 extends longitudinally between opposing longitudinal guide sides 116 and 118, which provides the guide 84 with a maximum longitudinal dimension 120 (see FIG. 6). This longitudinal dimension 120 is generally sized smaller than a maximum longitudinal dimension 122 of the base 82 that extends between the opposing longitudinal base sides 90 and 92. As such, when the guide 84 is attached to the base 82 as best seen in FIGS. 8 and 9, each longitudinal guide side 116, 118 is at least slightly recessed inward from the respective longitudinal base side 92, 90. However, the longitudinal dimension 120 is generally sized larger than (or at least equal to) a longitudinal dimension of the base 82 between the longitudinal base sides 90 and 92 at the vertical base end 96; e.g., about at the tapered portions 106 and 108. Referring again to FIGS. 5-7, the guide 84 extends vertically between opposing vertical guide ends 124 and 126, where the vertical guide end 126 is a distal end of the locator 78.

The guide 84 of FIG. 5-7 includes a mounting portion 128, an intermediate portion 130 and a tapered portion 132. The mounting portion 128 is configured to mate with the base 82 and thereby facilitate the attachment of the guide 84 to the base 82. The mounting portion 128 of FIGS. 5-7, for example, is configured as a lug such as, for example, a dovetail tenon for being received by the channel 110 in the base 82. In this manner, the guide 84 is attached to the base 82 at an interlocking joint. The guide 84 may also (or alternatively) be attached and secured to the base 82 using other techniques; e.g., via a fastener 134 as shown in FIG. 4, an interference fit, a bonded attachment, etc.

The intermediate portion 130 extends vertically between and is connected to the mounting portion 128 and the tapered portion 132. The intermediate portion 130 may include at least one aperture extending laterally therethrough to reduce guide 84 mass. The tapered portion 132 extends vertically out from the intermediate portion 130 to the distal end 126 of the locator 78. As the tapered portion 132 extends vertically to the to the distal end 126, a longitudinal dimension of the tapered portion 132 between the longitudinal guide sides 116 and 118 decreases to provide the tapered portion 132 with its tapering geometry. The tapered portion 132 may include at least one aperture extending laterally therethrough to reduce guide 84 mass.

With the foregoing guide 84 configuration, the guide 84 may be removably attached to the base 82. The guide 84 projects vertically out and is cantilevered from the base 82.

The guide 84 is configured from a guide material, which may be different from the base material. An example of a suitable guide material is non-metal material such as polymer, composite material, etc. Examples of polymer include, but are not limited to, thermoset material and thermoplastic material.

Figure 10:
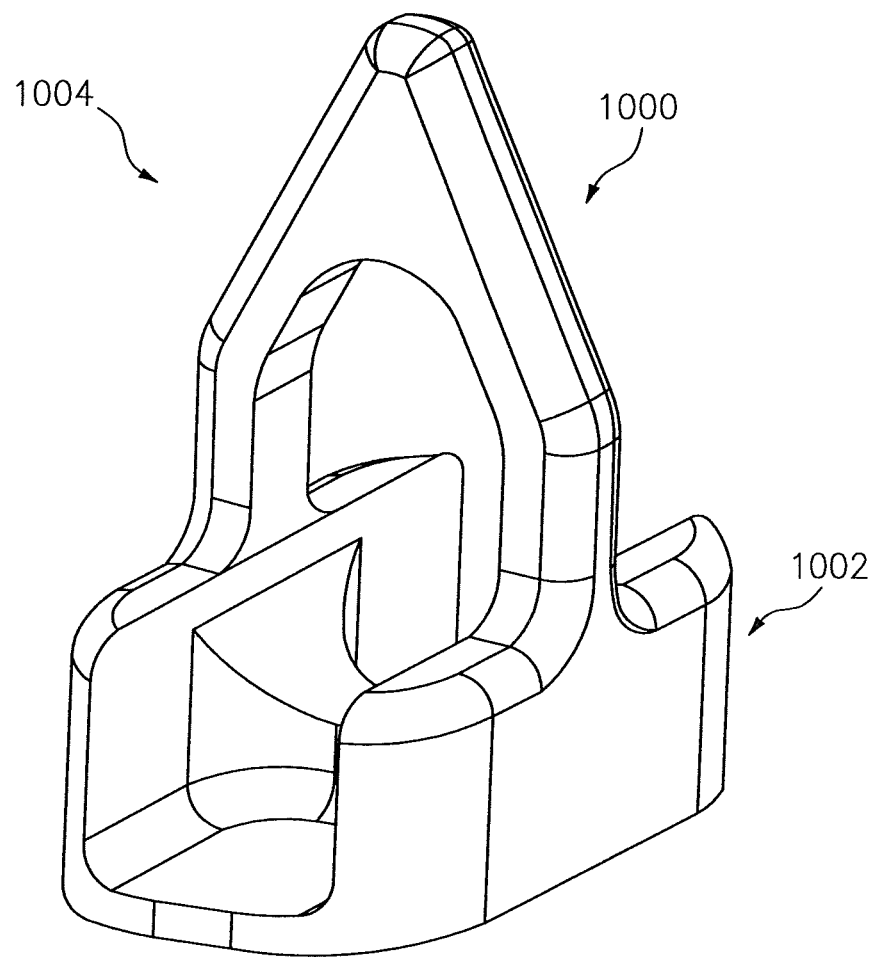
FIG. 10 is a perspective illustration of a single piece locator configured with a unitary body.

In general, the guide material is selected to have a lower strength, be more brittle or pliable than the base material such that if the guide 84 is subject to an unusual load, the guide 84 can bend and/or break leaving the base 82 and/or other structures of the nacelle 32 substantially or completely undamaged. For example, during aircraft propulsion system 30 maintenance where the fan cowls 42 are open (see FIG. 3), a person may improperly use the guide 84 as a handhold or a foothold. If the guide 84 were made from a high strength material such as the base material, the load imparted by the person could be transferred from the locator 78 into the fan cowl 42 causing the fan cowl 42 to deform or break, particularly where the cowl 42 is made from composite material such as, but not limited to, carbon fiber within a resin matrix. However, where the guide 84 is formed from a low strength material, the load imparted by the person may damage (e.g., bend or break) the guide 84 without also causing damage to the fan cowl 42.

Where the guide 84 is damages in such a manner or otherwise (e.g., wear), the damage guide 84 may be easily removed by removing the fastener 134 (see FIG. 4) and sliding the mounting portion 128 of the guide 84 out from the channel 110 in the base 82. A new guide 84 may then be mated with the base 82 without requiring the base 82 to be removed from the fan cowl 42. This enables a quick fix to the locator 78. In contrast, where a guide 1000 and a base 1002 are configured integral with one another as shown in FIG. 10, the base 1002 must be removed from the fan cowl. As a result, during mounting of a replacement locator 1004, the base 1002 must be relocated on the fan cowl to ensure proper fan cowl and inlet structure alignment. This relocation may require use of other locating and mounting fixtures and can be time consuming. The relocation may also require removal of the fan cowl 42 from the wing of the aircraft.

FIGS. 11-14 illustrate the alignment assembly 74 during a sequence of steps as the locator 78 is being mated with the receptacle 76. FIGS. 15-20 further illustrate the alignment assembly 74 during the sequence of steps as the locator 78 is being mated with the receptacle 76. During this sequence of steps, the fan cowl 42 is moved (e.g., pivoted) from the open position to its closed position (see FIGS. 14 and 20). When the fan cowl 42 is partially open (see FIGS. 11 and 12), the locator 78 is disengaged from the receptacle 76. However, once the fan cowl 42 is proximate its closed position, the guide 84 begins to engage the receptacle 76 (see FIGS. 13 and 15). More particularly, the guide 84 projects into an aperture in the receptacle 76 and may slide against the receptacle 76. As the guide 84 and receptacle 76 slide against one another, the receptacle 76 may cause the guide 84 and, thus, the fan cowl 42 to be axially repositioned towards the aligned position shown in FIG. 1. At the intersection between the guide 84 and the base 82, the receptacle 76 slides off of the guide 84 and onto the base 82 and its flanges 100 and 102 (see FIGS. 17 and 18) into its final and fully mated position (see FIG. 20). When in the fully mated position, the base 82 is operable to maintain the axial alignment of the fan cowl 42 with the inlet structure 40 due to the axial engagement between both sides of the base 82 and the receptacle 76.

In the fully mated position, loads may be transferred between the receptacle 76 and the base 82. However, since the guide 84 is recessed from the sides 90 and 92 of the base 82 (see FIG. 21); no loads are transferred between the receptacle 76 and the guide 84. This arrangement enables the guide 84 to be made from a material with a lower strength than the base material as discussed above.

Figure 22:
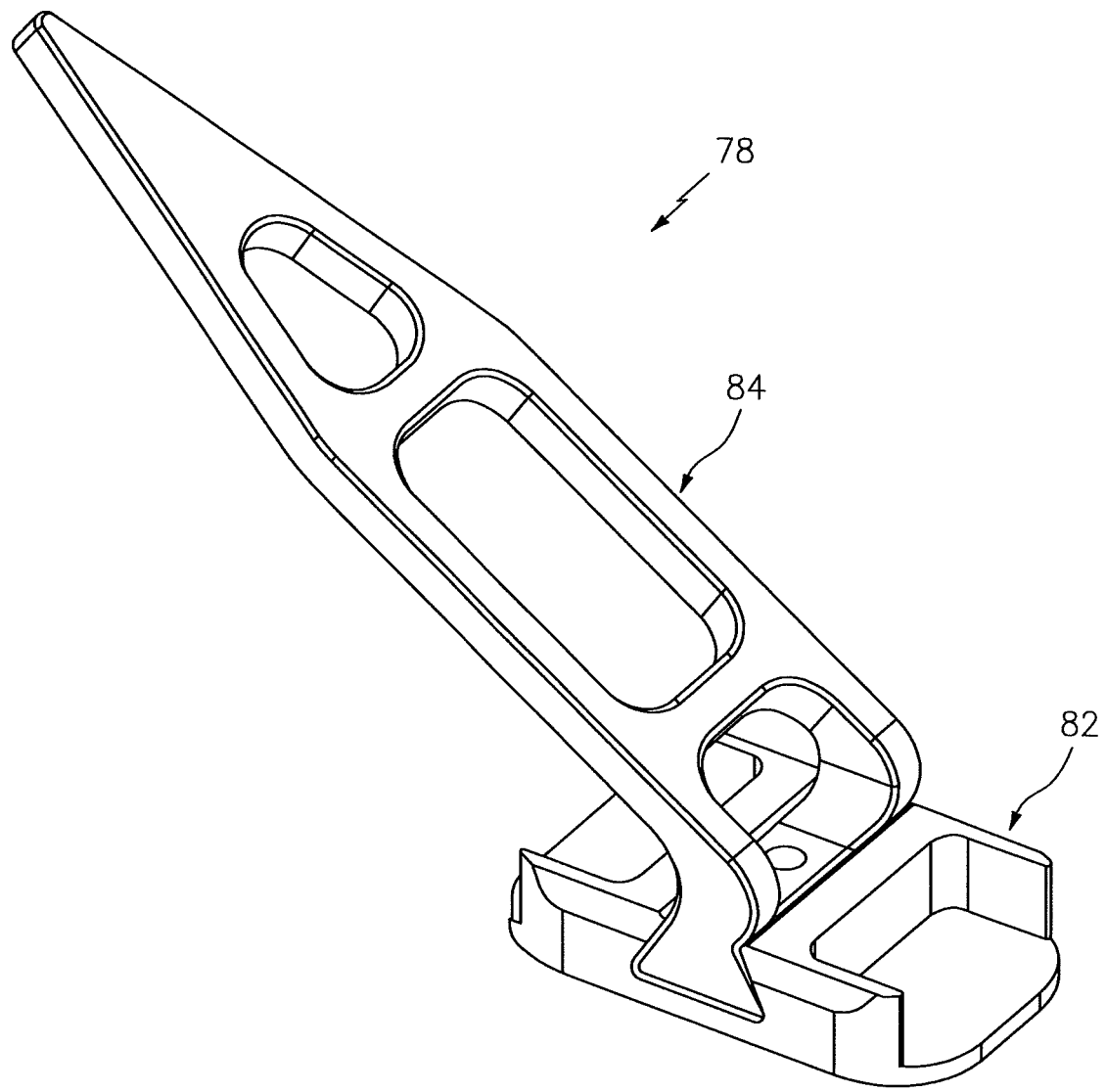
FIG. 22 is a perspective illustration of another multi-piece locator.

The components of the alignment assemblies may have various other configurations than those specifically described above. For example, the guide 84 may have different forms/geometries depending upon its specific location on the nacelle 32 and/or the specific way the fan cowl 42 moves between the open and closed positions. An exemplary embodiment of such an alternative guide 84 configuration is shown in FIG. 22.

While the alignment assemblies are described above as aligning the fan cowls 42 with the inlet structure 40, these assemblies may alternatively be used to align other nacelle structures with other nacelle cowls.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:
1. A system for an aircraft propulsion system, comprising:
a nacelle structure;
a nacelle cowl configured to move between a closed position and an open position; and
an alignment assembly comprising a pair of mating components respectively arranged with the nacelle structure and the nacelle cowl, a first of the pair of mating components comprising a receptacle, and a second of the pair of mating components comprising a locator;
the locator configured to mate with the receptacle and thereby locate the nacelle cowl relative to the nacelle structure when the nacelle cowl is in the closed position, and the locator comprising a base and a guide attached to the base, wherein the guide is formed as a discrete body from the base;
wherein the base is configured with a dovetail mortise;
wherein the guide is configured with a dovetail tenon arranged within the dovetail mortise; and
wherein a portion of the guide, which extends through an aperture in the receptacle when the nacelle cowl is in the closed position, is cantilevered from and projects out from the dovetail tenon.

2. The system of claim 1, wherein the base is mounted to and connects the guide to a respective one of the nacelle structure and the nacelle cowl.

3. The system of claim 1, wherein
the guide is configured to project into and slide against the receptacle as the nacelle cowl moves towards the closed position to thereby guide the receptacle onto the base; and
the base is configured to mate with the receptacle when the nacelle cowl is in the closed position.

4. The system of claim 1, wherein the receptacle is configured to impart a load onto the base but not onto the guide when the nacelle cowl is in the closed position.

5. The system of claim 1, wherein the receptacle is configured to impart a load onto the base when the nacelle cowl is in the closed position.

6. The system of claim 1, wherein the guide is removably attached to the base.

7. The system of claim 1, wherein
the guide is attached to the base at an interlocking joint; and
the dovetail mortise and the dovetail tenon form the interlocking joint.

8. The system of claim 1, wherein the guide is attached to the base by a fastener.

9. The system of claim 1, wherein
the base comprises first material; and
the guide comprises second material that is different from the first material.

10. The system of claim 1, wherein
the base comprises metal; and
the guide comprises polymer.

11. The system of claim 1, wherein
the first of the pair of mating components is mounted to the nacelle structure; and
the second of the pair of mating components is mounted to the nacelle cowl.

12. The system of claim 1, wherein
the nacelle structure comprises a nacelle inlet structure; and
the nacelle cowl comprises a fan cowl.

13. A system for an aircraft, comprising:
a propulsion system comprising a receptacle and a locator;
the receptacle comprising an annular plate;
the locator comprising a base and a guide projecting out and cantilevered from the base;
the guide configured to project into and slide against the annular plate as the receptacle moves towards a fully mated position to thereby guide the annular plate onto the base; and
the base configured to mate with the annular plate when the receptacle is in the fully mated position;
wherein the base comprises metal and the guide comprises non-metal material;
wherein the base is configured with a mortise;
wherein the guide is configured with a tenon mated with the mortise to provide an interlocking joint between the base and the guide; and
wherein a cantilevered portion of the guide, which extends through an aperture in the annular plate when the receptacle is in the fully mated position, projects out from the tenon.

14. The system of claim 13, wherein
the receptacle is configured to impart a load onto the base when the receptacle is in the fully mated position; and
the receptacle is further configured not to impart a load onto the guide when the receptacle is in the fully mated position.

15. The system of claim 13, further comprising:
a nacelle structure; and
a nacelle cowl configured to move between a closed position and an open position, wherein the receptacle is in the fully mated position when the nacelle cowl is in the closed position;
the receptacle mounted to the nacelle structure; and
the base mounted to the nacelle cowl.

16. A system for an aircraft propulsion system, comprising:
a nacelle structure;
a nacelle cowl configured to move between a closed position and an open position; and
an alignment assembly comprising a pair of mating components respectively arranged with the nacelle structure and the nacelle cowl, a first of the pair of mating components comprising a receptacle, and a second of the pair of mating components comprising a locator;
the locator configured to mate with the receptacle and thereby locate the nacelle cowl relative to the nacelle structure when the nacelle cowl is in the closed position, and the locator comprising a base and a guide attached to the base, wherein the guide is formed as a discrete body from the base;
wherein the guide is attached to the base at an interlocking joint; and
wherein the interlocking joint is configured as a mortise and tenon joint.

* * * * *